(12) United States Patent
Kim et al.

(10) Patent No.: US 7,555,042 B2
(45) Date of Patent: Jun. 30, 2009

(54) METHOD AND APPARATUS FOR REVERSE PLAY

(75) Inventors: Youngduck Kim, Suwon-si (KR);
Jaehong Park, Seongnam-si (KR);
Kyoungmook Lim, Yongin-si (KR);
Kyungheon Noh, Suwon-si (KR);
Sehwoong Jeong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1179 days.

(21) Appl. No.: 10/337,857

(22) Filed: Jan. 8, 2003

(65) Prior Publication Data
US 2004/0131118 A1    Jul. 8, 2004

(51) Int. Cl.
*H04N 7/12* (2006.01)
*H04N 11/02* (2006.01)
*H04N 11/04* (2006.01)
*H04B 1/66* (2006.01)

(52) U.S. Cl. .............................. 375/240.12

(58) Field of Classification Search .... 375/240–240.29; 707/101
See application file for complete search history.

(56) References Cited

U.S. PATENT DOCUMENTS

| | | | | |
|---|---|---|---|---|
| 5,623,344 A * | 4/1997 | Lane et al. | ..................... | 386/81 |
| 5,739,862 A * | 4/1998 | Cen | ..................... | 375/240.15 |
| 5,742,347 A | 4/1998 | Kandlur et al. | | |
| 5,774,498 A * | 6/1998 | Oya et al. | ..................... | 375/257 |
| 5,805,762 A * | 9/1998 | Boyce et al. | ................... | 386/68 |
| 5,926,609 A * | 7/1999 | Shikakura et al. | ........... | 386/111 |
| 5,974,224 A | 10/1999 | Nagata | | |
| 6,009,229 A * | 12/1999 | Kawamura | ..................... | 386/68 |
| 6,115,537 A * | 9/2000 | Yamada et al. | ............... | 386/109 |
| 6,353,700 B1 | 3/2002 | Zhou | | |
| 6,473,558 B1 | 10/2002 | Wu et al. | | |
| 6,557,001 B1 * | 4/2003 | Dvir et al. | ..................... | 707/101 |
| 2002/0061184 A1 * | 5/2002 | Miyamoto | ..................... | 386/68 |

FOREIGN PATENT DOCUMENTS

| | | |
|---|---|---|
| EP | 0 753 974 A2 | 1/1997 |
| JP | 1997-037209 | 7/1997 |
| JP | 2000-101969 | 7/2000 |

OTHER PUBLICATIONS

European Search Report (dated Oct. 9, 2007) for counterpart European Patent Application 03255327.3-2223 is provided for the purposes of certification under 37 C.F.R. §§ 1.97(e) and 1.704(d).
Korean Office Action dated Jul. 8, 2005, with English translation.

* cited by examiner

*Primary Examiner*—Nhon T Diep
(74) *Attorney, Agent, or Firm*—Harness, Dickey & Pierce, P.L.C.

(57) ABSTRACT

In the method and apparatus for reverse play, the forward predictive encoded pictures in a compressed video stream are decoded, and selected ones of the decoded, forward predictive encoded pictures are re-encoded as anchor pictures. These anchor pictures are then used to decode portions of the compressed video stream for display in a reverse display order.

20 Claims, 15 Drawing Sheets

| I-12 | I-12 | I-12 | I-12 | I-12 | I-12 | I-12 | I-0 | I-0 | I-0 | I-0 | I-0 | I-0 |
|---|---|---|---|---|---|---|---|---|---|---|---|---|
|  | I-6 | I-6 | I-6 | I-6 | I-6 | I-6 | I-6 | I-6 | I-6 | I-6 | I-6 | I-6 |
|  |  | P-9 | P-9 | P-9 | P-9 | P-9 |  | P-3 | P-3 | P-3 | P-3 | P-3 |
|  |  |  | B-11 | B-10 | B-8 | B-7 |  |  | B-5 | B-4 | B-2 | B-1 |

| AN INDEPENDENT SMALL GROUP | ANOTHER INDEPENDENT SMALL GROUP |

METHOD AND APPARATUS FOR REVERSE PLAY

BACKGROUND OF THE INVENTION

In the processing of digital multimedia data, particularly video data, compression and the compression techniques employed offer significant advantages in storage and transmission. MPEG has become the predominant standard in handling such video data. The MPEG standard defines the structure of a compressed data stream, referred to as an MPEG data stream, and this structure imposes several constraints on the storage and play of video data. FIG. 1 illustrates an example of an MPEG data stream. In the example of FIG. 1, the video stream is divided into intra frames I, predictive frames P, and interpolated frames B. The I frames are a type of frame commonly referred to as an anchor frame. The P frames are a type of forward predictive encoded frame in that P frames are encoded based on a temporally preceding frame. The B frames are a type of bi-directionally encoded frame in that B frames are encoded based on a temporally preceding and succeeding frames. The frames from one I frame to the next are commonly referred to as a group of pictures or GOP. While the discussion of MPEG techniques, prior art systems and the present invention will use the example of a video stream divided into frames, it will be understood that the MPEG standard also provides for structures other than frames, such as even and odd fields, top and bottom fields, etc. In this disclosure, the terminology "picture" will be used as a generic term covering the frame, field, etc. formats.

Referring again to FIG. 1, I frames are encoded independent of any other frames in the sequence. Accordingly, decoding an I frame does not require any other frame in this sequence. P frames are encoded using motion estimation, and are dependent on the preceding I or P frame in the sequence. Accordingly, with P frames, these frames cannot be decoded without the preceding I or P frame. B frames are encoded using the I or P frame preceding the B frame and the I or P frame succeeding the B frame as indicated by the arrows in FIG. 1. Accordingly, with B frames, these frames cannot be decoded without the preceding and succeeding I or P frames.

FIG. 1 illustrates the display order of the frames in a GOP. However, because of the decoding dependency of P and B frames, the order in which the frames are presented to the decoder is much different than their display order. FIG. 2 illustrates both the display and decoding orders 202 and 204 of the GOP illustrated in FIG. 1. As shown by the decoding order 204, the frames needed for decoding a subsequent P or B frame, are received by the decoder prior to receipt of that P or B frame. Typically, the decoded frames are temporarily stored in a memory and then read out in the display order 202 for display.

Such a system works well for displaying the video data in a normal forward play mode, but there are instances where a user may want to play the video data in a reverse play mode. As will be appreciated, this adds a level of complexity in decoding B and P frames. For example, displaying frame B14 requires decompressing frames P13 and I16, but decompressing frame P13 requires decompressing frame P10, which requires decompressing frame P7, which requires decompressing frame P4, which requires decompressing frame I1. Thus, decoding a P frame during the reverse play mode, requires decoding, in a reverse sequence, all the P frames until an I frame is reached.

FIG. 3 illustrates a prior art MPEG decoder that supports a reverse play mode. As shown, an input device 302 stores an MPEG data stream. A decoder 304 decodes the compressed data stored in the input device 302. The decoder 304 outputs the decompressed data in the forward play display order for display on a display device 306. The decompressed data output from the decoder 304 is also stored by a frame buffer memory 308. During reverse play, the frame buffer memory 308 is accessed, and the decompressed data is read out in the reverse display order for display on the display device 306. To permit reverse play as described, the prior art system of FIG. 3 requires an extremely large frame buffer memory 308.

Japanese Patent JP 2000-101969 discloses a similar system to that discussed above with respect to FIG. 3. However, in this Japanese patent document, only the I and P frames are stored in the frame buffer memory during forward play. During reverse play, the B frames are decompressed using the stored decompressed I and P frames, and the decompressed frames are played out in the reverse play order. As will be appreciated, if the number of frames in a GOP is large, then the frame buffer memory must still be quite large to permit reverse play.

Japanese Patent JP 1997-037209 also discloses a system that supports the reverse play mode. In this system, only I frames are decoded and displayed in the reverse play mode. As a result, only partial frames are played in the reverse play mode, and the quality of the resulting display is of extremely poor quality.

FIG. 4 illustrates a block diagram of another prior art system that supports the reverse play mode. As shown, an input device 402 stores an MPEG data stream. A decoder 404 decodes the compressed data stored in the input device 402. The decoder 404 temporarily stores the decompressed data in a frame memory 406. The decoded frames are read out from the frame memory 406 in the display order and displayed on a display device 412. During this forward play mode of operation, the decoded frames sent to the display device 412 are also received by an I frame encoder 410. The I frame encoder 410 encodes the decompressed frames in I frame format, and stores the I frames in a buffer memory 408. During the reverse play mode, the frames stored in the buffer memory 408 are read out and decoded by the decoder 404. The decoded frames, read from the buffer memory 408 in reverse order, are then displayed on a display device 412.

As compared to the system illustrated in FIG. 3, a smaller memory is required because the frames are stored in a compressed format. On the other hand, more encoding is required. And, because all of the frames are re-encoded into I frame format and stored, a significant amount of memory space is still required for the reverse play mode. Also, because all compressed I frames must be decoded again to be displayed, more processing time is also required.

U.S. Pat. No. 5,742,347 discloses another system for decoding and displaying an MPEG data stream in both forward play and reverse play modes. As disclosed, each decompressed P frame is re-encoded as an I frame and stored in a secondary storage device. During reverse play, the secondary storage device is accessed to decode and display P frames, and is also accessed to obtain the P frames needed for decoding B frames. As a result, the need to decode multiple P frames until an I frame is reached as discussed above with respect to FIG. 3 is not required, and because there is no motion estimation and compensation required for compressing a single frame into an I frame, the I frame encoding is performed efficiently. However, for large GOPs, this technique still requires a relatively large secondary storage. Also, I frame encoding is still required, even if all B frames are not encoded into I frames. Accordingly a demand to reduce the processing time including the encoding and decoding time and to make the secondary storage smaller still exists.

SUMMARY OF THE INVENTION

A method and apparatus for reverse play according to the present invention offers a significant reduction in the amount of memory space required for performing reverse play of a compressed data stream. In accordance with the embodiments of the present invention, a subset of the forward predictive encoded pictures in the compressed data stream are re-encoded as anchor pictures after being decoded. Because less than all of the forward predictive encoded pictures are re-encoded as anchor pictures, less memory space is required during the reverse play operation.

Furthermore, in accordance with principles of the present invention, temporally adjacent anchor pictures form an independent group within a larger group of pictures. The independent group is independent in that the pictures outside that group are not required in order to perform the decoding operation of the pictures within the group. As such, less memory space is required during the decoding operation in order to decode and play the data in the reverse play mode.

In generating the re-encoded anchor pictures, one embodiment of the present invention calls for performing the re-encoding operation separate and apart from any other operating modes of the invention. However, another embodiment of the present invention creates the re-encoded anchor pictures during the forward play operation. In accordance with another embodiment, instead of storing each of the decoded pictures needed for decoding any one of the pictures in the independent group, only the decoded pictures necessary for decoding an upcoming picture are stored in memory. This embodiment requires less memory space, but also requires decoding the same picture more than once during the decoding and playback operation.

According to a further embodiment, a greater reduction in the memory requirement is achieved by sub-sampling the decoded, forward predictive encoded pictures being re-encoded as anchor pictures. And in yet another embodiment of the present invention, the forward predictive encoded pictures, which do not undergo re-encoding as anchor pictures, are decoded and re-encoded based on the anchor pictures that precede them in the reverse play order when displayed in the reverse play mode.

BRIEF DESCRIPTION OF THE DRAWINGS

The present invention will become more fully understood from the detailed description given below and the accompanying drawings, wherein like elements are represented by like reference numerals, which are given by way of illustration only and thus are not limitative of the present invention and wherein.

DETAILED DESCRIPTION OF THE INVENTION

The architecture for implementing the method for reverse play of an MPEG data stream will be described followed by the exemplary embodiments of the method.

Architecture

Figure 5:
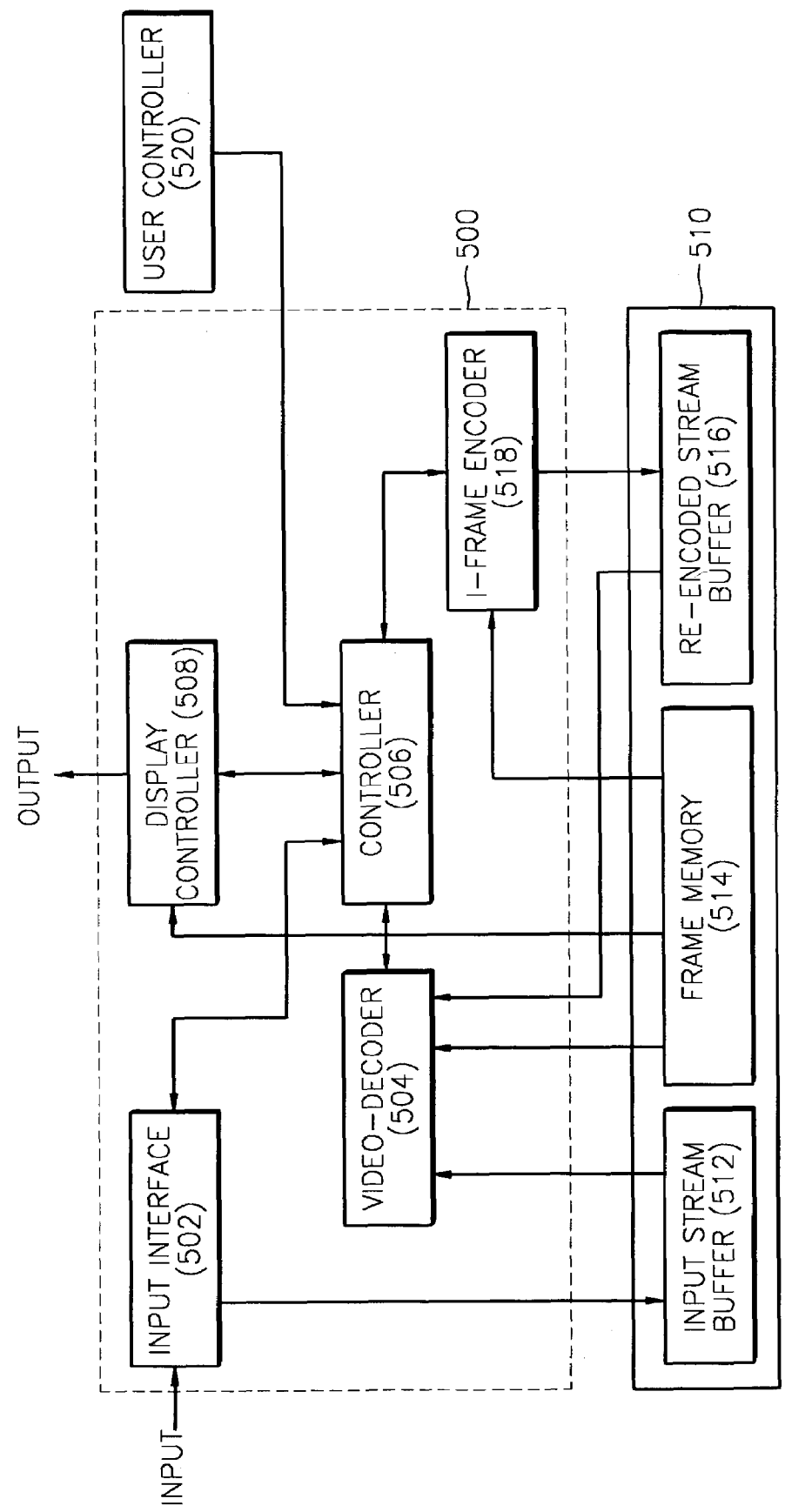
FIG. 5 illustrates a block diagram of an architecture according to the present invention for employing the method for reverse play according to the present invention.

FIG. 5 illustrates a block diagram of the system architecture for implementing the method for reverse play of an MPEG data stream according to the present invention. As shown, an input interface 502 inputs the MPEG data stream, and stores the MPEG data stream in an input stream buffer 512. Under the controlled of a controller 506, a video decoder 504 decompresses (i.e., decodes) the MPEG data stream, and temporarily stores the decompressed data in a frame memory 514. The controller 506 also controls a display controller 508 to output the decompressed frames in a proper display order in either the forward or reverse display modes. The controller 506 further causes an I frame encoder 518 to encode selected, decoded P frames in the frame memory 514 into I frames, which are then stored in re-encoded stream buffer 516. During the reverse play mode, the controller 506 controls the video decoder 504 to decode the I frames stored in the re-encoded stream buffer 516 as needed for display in the reverse play mode. The operation of the controller 506 is controlled in part by a user controller 520. Through user controller 520, a user indicates whether to stop, pause, forward play or reverse play a MPEG data stream.

The controller 506 is a conventional microprocessor programmed to implement the methodology according to the present invention as discussed in greater detail below. The display controller 508 is any conventional display controller that reads data from a memory and converts that data to RF or digital signals for display. The input stream buffer 512, frame memory 514 and re-encoded stream buffer 516 can be separate memory devices, or can be embodied as a single memory device that is logically partitioned into the three different memories. Whether independent storage devices or a single storage device, the storage device(s) can be embodied as a conventional RAM, HDD, flash memory, etc.

Forward Play

The operation of the system according to the present invention in the forward play mode will be described with respect to FIG. 6. As shown, the input interface 502 stores the input MPEG data stream in the input stream buffer 512 in step S2. Under the control of the controller 506, the video decoder 504 accesses the frames of compressed data stored in the input stream buffer 512. The video decoder 504 determines the frame type in step S4. If the frame type is I frame, the processing proceeds to step S6 wherein the I frame is decoded in a conventional manner; namely, no motion compensation is required. Subsequently, in step S8, the video decoder stores the decoded I frame in the frame memory 514.

Returning to step S4, if the video decoder 504 determines the frame is a P frame, in the step S112 the video decoder 504 references the prior decoded I or P frame stored in the frame memory 514, and decodes the P frame in the conventional manner. The decoded P frame is then stored in the frame memory 514 in step S14. Returning again to step S4, if the video decoder 504 determines that the frame is a B frame, then in step S16, the video decoder 504 accesses the temporally preceding and succeeding decompressed I or P frames stored in the frame memory 514 necessary for decoding the B frame, and decodes the B frame in the conventional manner. This process continues with subsequently decompressed frames being written over previously decompressed frames that have already been displayed and are no longer necessary for the decompression process.

Furthermore, once a sufficient number of frames have been decompressed and stored in the frame memory 514, the display controller 508 under the control of the controller 506 accesses the decompressed frames in the forward play display order and generates a display output.

Reverse Play

Figure 2:
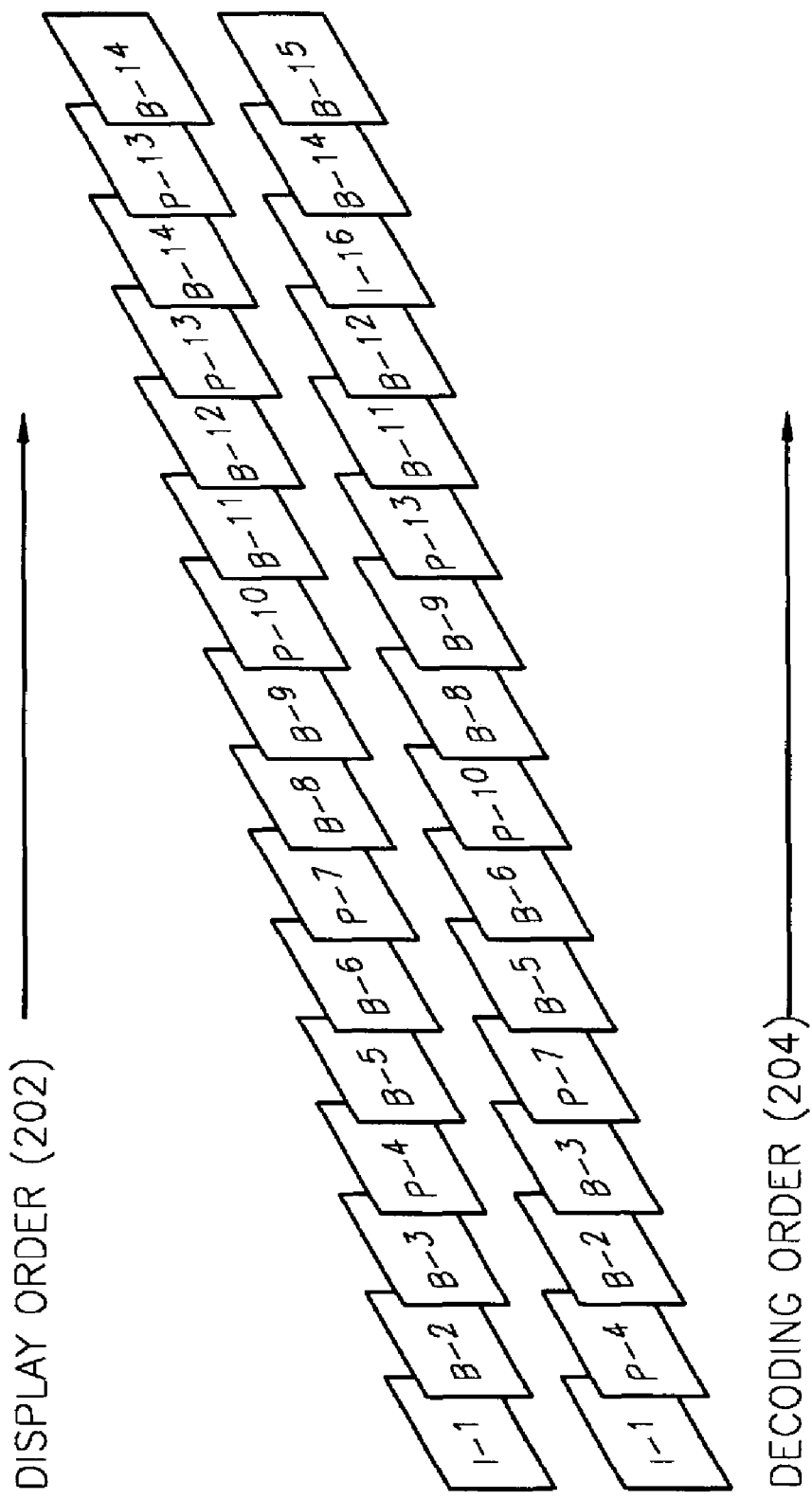
FIG. 2 illustrates the forward display order and the forward display decoding order for a GOP according to the MPEG standard.
Figure 3:
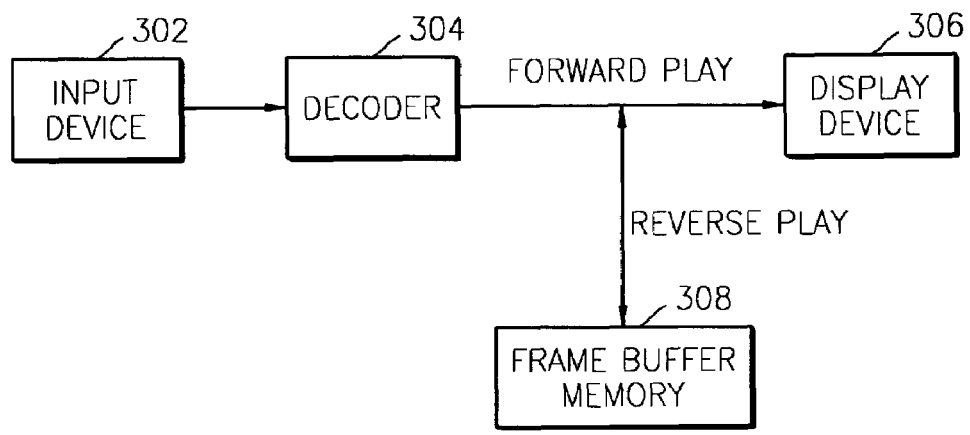
FIG. 3 illustrates a block diagram of a prior art system that supports forward and reverse play modes.
Figure 4:
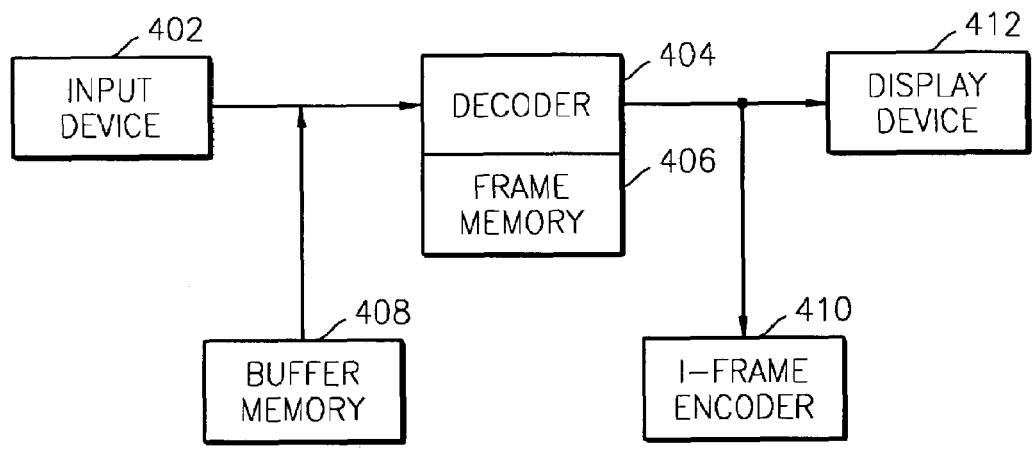
FIG. 4 illustrates another block diagram of a prior art system that supports forward and reverse play modes.
Figure 7A:
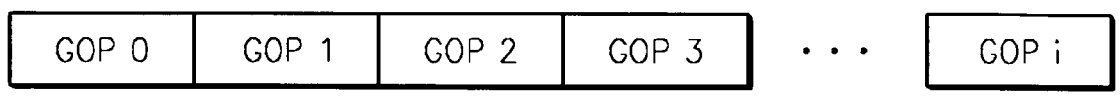
FIG. 7A illustrates an MPEG stream at the GOP level.
Figure 7B:
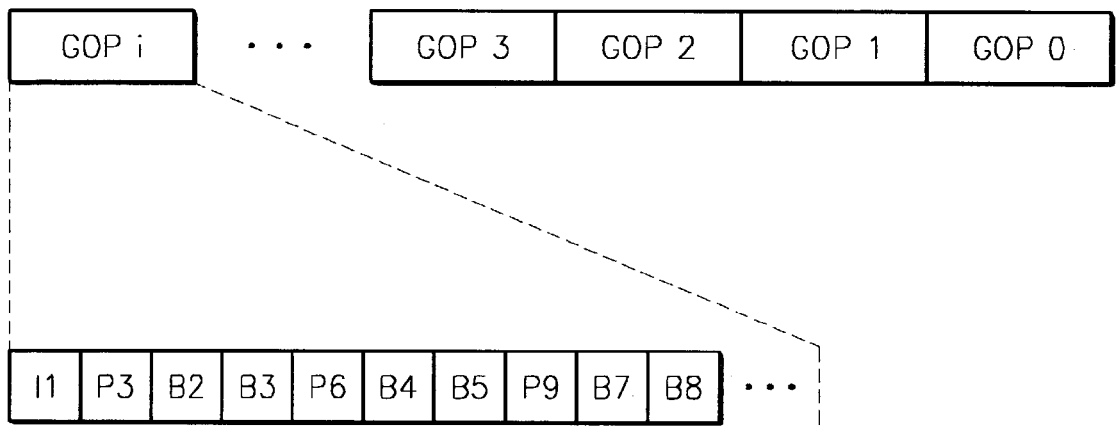
FIG. 7B illustrates the GOP order in the reverse play mode, and the pictures within one of the GOP.

FIG. 7A illustrates, at the GOP level, the original MPEG stream. FIG. 7B shows that in the reverse play mode, the GOP are read out in reverse order. However, as further shown in FIG. 7B, while the GOP are accessed or input in reverse order, the pictures within a GOP are still in the same decoding order as illustrated in FIG. 2. Accordingly, in the reverse play mode, the pictures forming a GOP must be decoded in a way to permit reversal of the display order of the pictures as compared to the display order illustrated in FIG. 2.

FIRST EMBODIMENT

Figure 8:
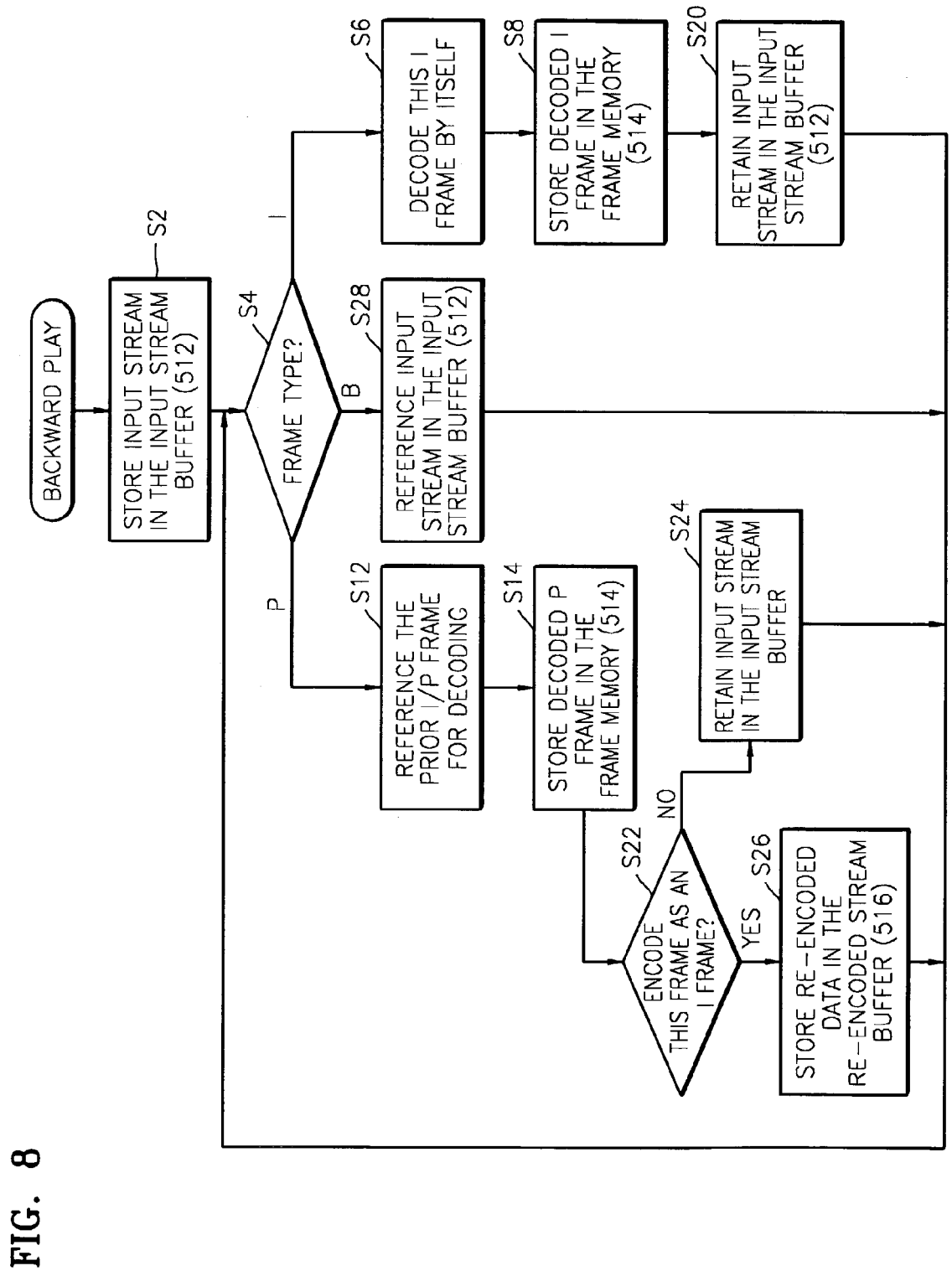
FIG. 8 illustrates the P frame re-encoding process according to a first embodiment of the present invention.
Figure 9:
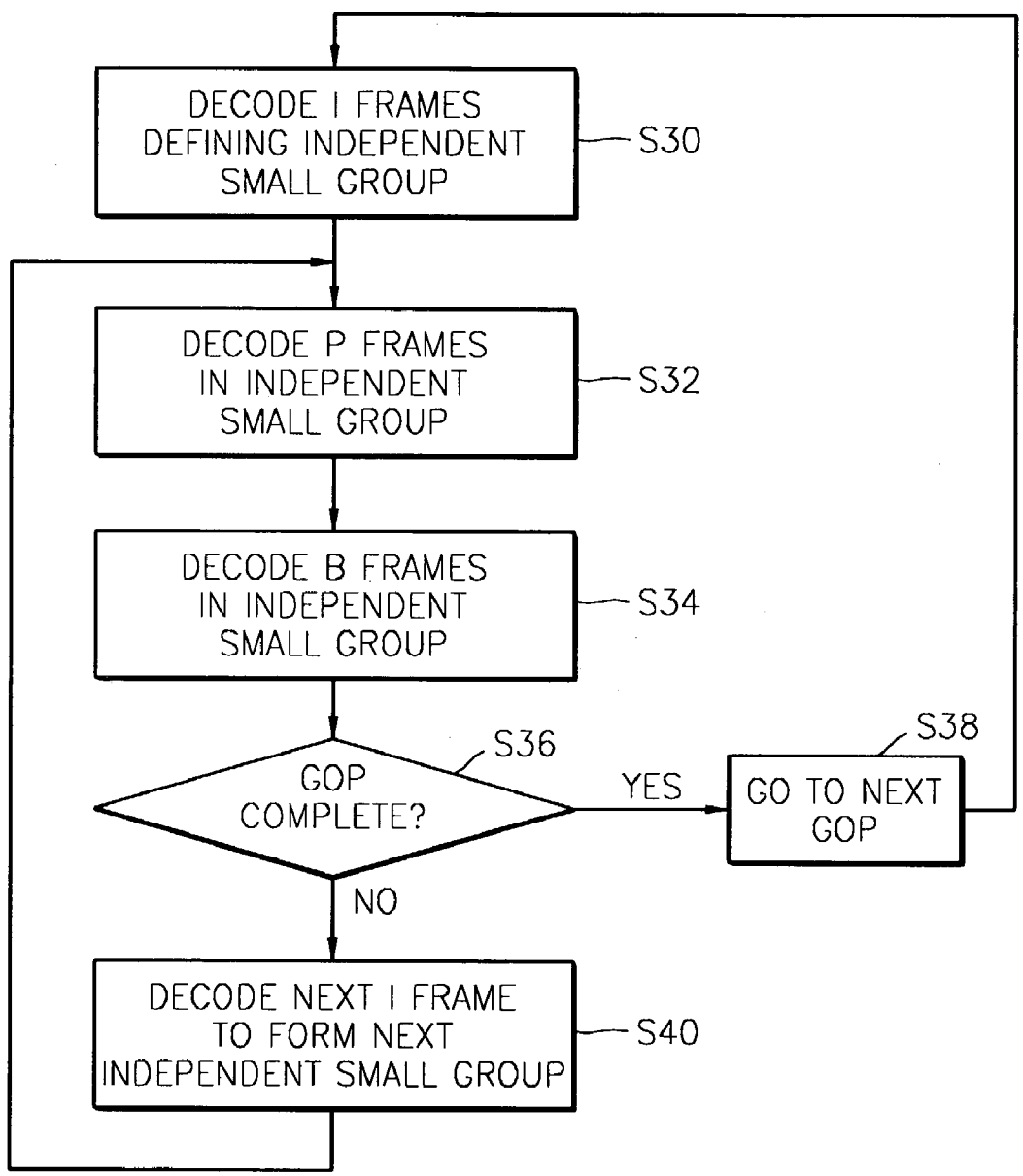
FIG. 9 illustrates the decoding process for the reverse play mode according to the first embodiment of the present invention.

A first embodiment of the method for reverse play according to the present invention will be described with respect to FIGS. 8 and 9. FIG. 8 illustrates a re-encoding process for the reverse play operation, and FIG. 9 illustrates the decoding process for reverse play.

Figure 6:
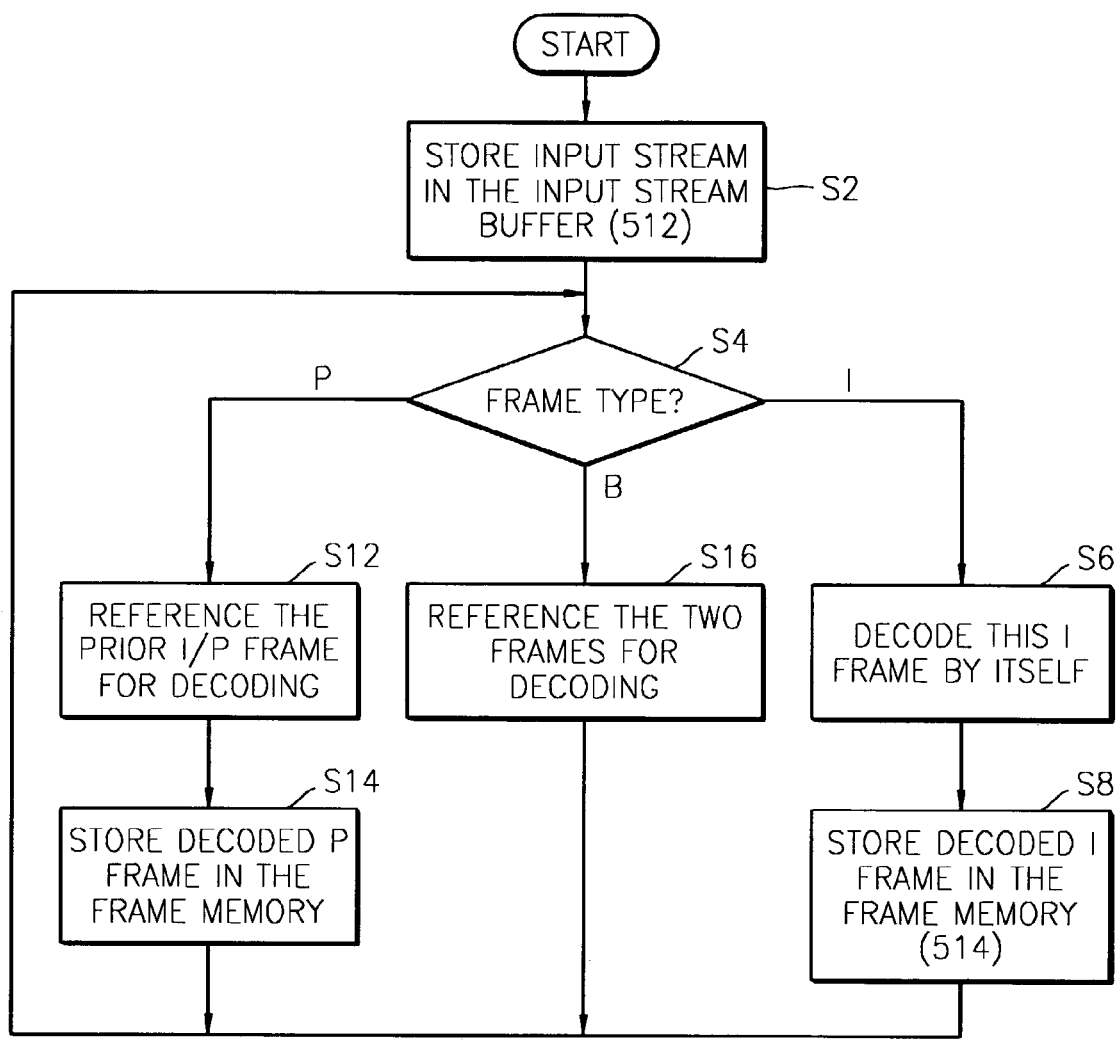
FIG. 6 illustrates a flowchart showing the decoding process in the forward play mode according to the present invention.

FIG. 8 includes the same steps illustrated in FIG. 6 except that step S28 has replaced step S16, and new steps S20, S22, S24 and S26 have been added. Accordingly, like reference numerals have been used to designate like steps, and the description of these previously described steps will not be repeated for the sake of brevity. Instead, only the new steps will be described.

Referring to FIG. 8, after the decoded I frame is stored in the frame memory 514 in step S8, the encoded I frame is retained in the input stream buffer S20. Referring to step S4, if the video decoder 504 determines that a frame is a B frame, then in step S28, the encoded B frame is retained in the input stream buffer 512.

After a decoded P frame is stored in memory 514, the controller 506 in step S22 determines whether to have this P frame encoded as an I frame. According to the method of the present invention, a subset of the decoded P frames, where that subset includes less than all of the decoded P frames, are re-encoded as I frames. In an exemplary embodiment, the controller 506 skips, for a GOP, every n P frames before encoding a P frame, where n is an integer greater than or equal to 1. For example, with n equal to 1, the controller 506 in step S22 causes every other P frame to be encoded as an I frame by the I frame encoder 518. If a decoded P frame is not to be re-encoded as an I frame, then in step S24, the compressed P frame is retained in the input stream buffer 512. However, if the controller 506 determines that the P frame is to be re-encoded as an I frame, then the I frame encoder 518 accesses the decoded P frame from frame memory 514, re-encodes the decoded P frame as an I frame, and stores the encoded I frame in the re-encoded stream buffer 516 in step S26.

Figure 1:
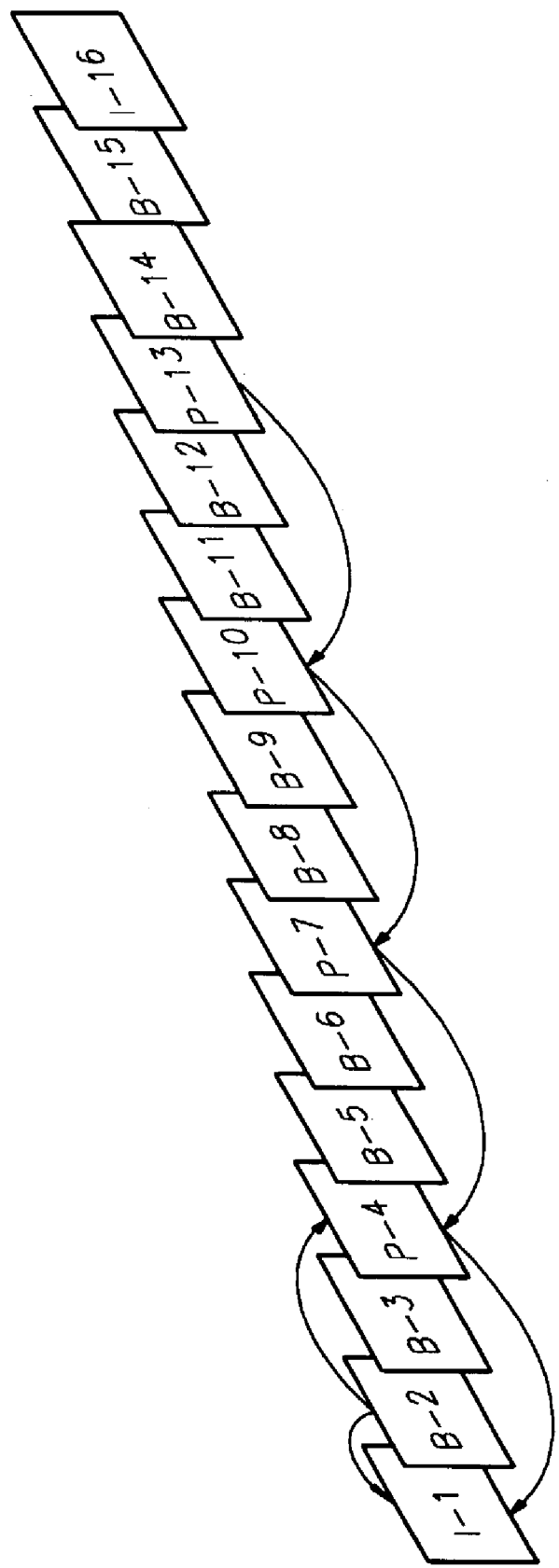
FIG. 1 illustrates a GOP according to the MPEG standard.
Figure 10A:
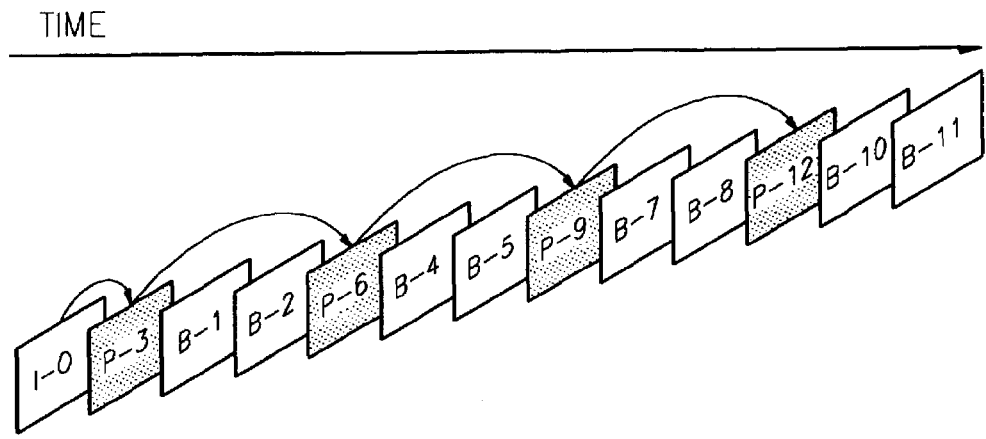
FIGS. 10A-10E illustrate an exemplary MPEG data stream, re-encoded MPEG data stream, reverse display order, reverse decoding order and frame memory contents, respectively, for reverse play according to the first embodiment of the present invention.
Figure 10B:
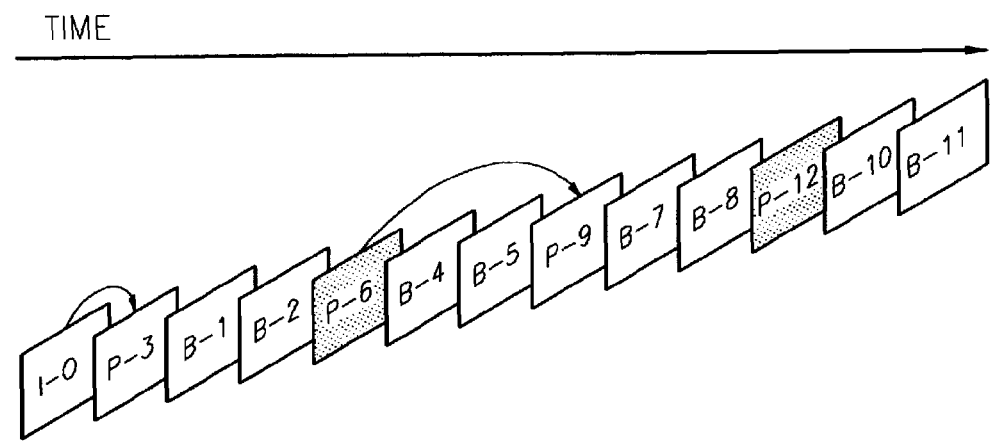

FIG. 10A illustrates a portion of the MPEG data stream illustrated in FIG. 1. For this portion of the MPEG data stream, FIG. 10B illustrates the resulting re-encoded stream generated as a result of the process shown in FIG. 8 when the I frame encoder 518 is instructed by the controller 506 to re-encode every other P frame. Namely, the re-encoded stream 704 includes I frames I6 and I12 instead of P frames P6 and P12. After the re-encoding process of FIG. 8 is completed for a GOP, the decoding process of FIG. 9 is conducted for that GOP. Simultaneously, the re-encoding process of FIG. 8 is conducted for the next GOP. As shown in FIG. 9, in step S30, the controller 506 causes the video decoder 504 to access, in the reverse display order, temporally adjacent encoded I frames in the GOP. The video decoder 504 accesses these I frames from the input stream buffer 512, decodes the I frames, and stores the decoded I frames in the frame memory 514.

Figure 11A:
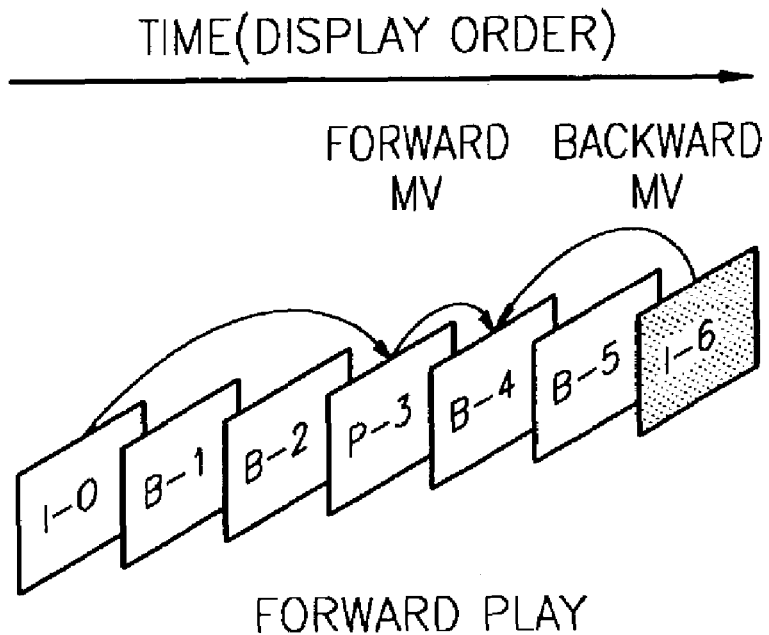
FIGS. 11A and 11B illustrate the motion vectors before and after the decoding operation according to the first embodiment of the present invention.
Figure 11B:
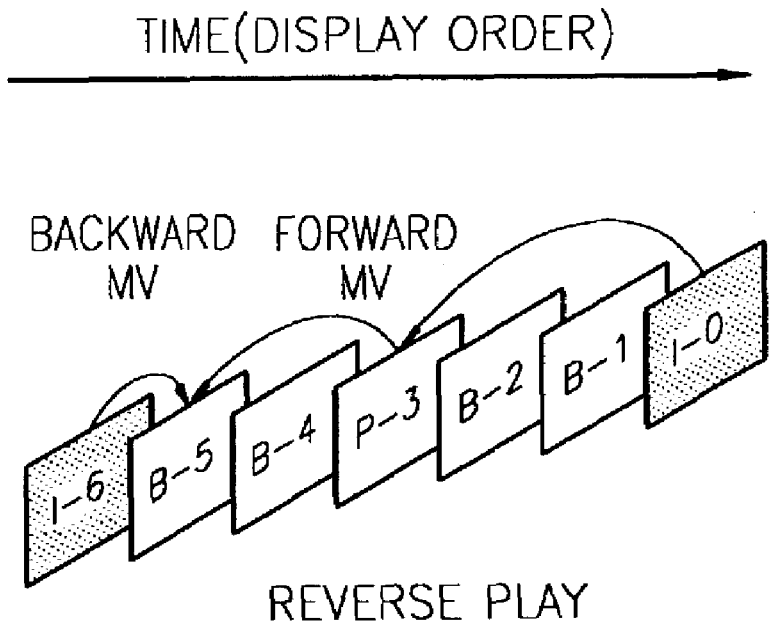

The two reverse display order temporally successively 1 frames form an independent small group. Between the successively decoded I frames are one or more P frames and four or more B frames. In step S32, the controller 506 causes the video decoder 504 to decode each of the P frames in the independent small group. As is known in the art, decoding P frames and B frames involves motion compensation based on a motion vector. These vectors like any vector have both a direction and a magnitude. During forward play as illustrated in FIG. 11A, the motion vector for a P frame such as P3 is a forward motion vector pointing to I frame I0, which precedes the P frame in the display order. However, as shown in FIG. 11B, in reverse play I frame I0 follows the P frame P3 in the reverse display order. As a result, that forward motion vector no longer correctly points to the I frame I0. Instead, the forward motion vector for P frame P3 needs to be converted to a backward motion vector in order to decode the P frame. The same is true of the forward and backward motion vectors used in the motion compensation decoding of B frames. (See FIGS. 11A and 11B as well). This conversion of motion vectors for the purposes of reverse play is well known in the art as evidenced by U.S. Pat. No. 5,739,862, and is knowledge inherently assumed in the prior art discussed in the Background of the Invention section of this patent. Accordingly, this motion vector compensation will not be described in detail for the sake of brevity.

Figure 10C:
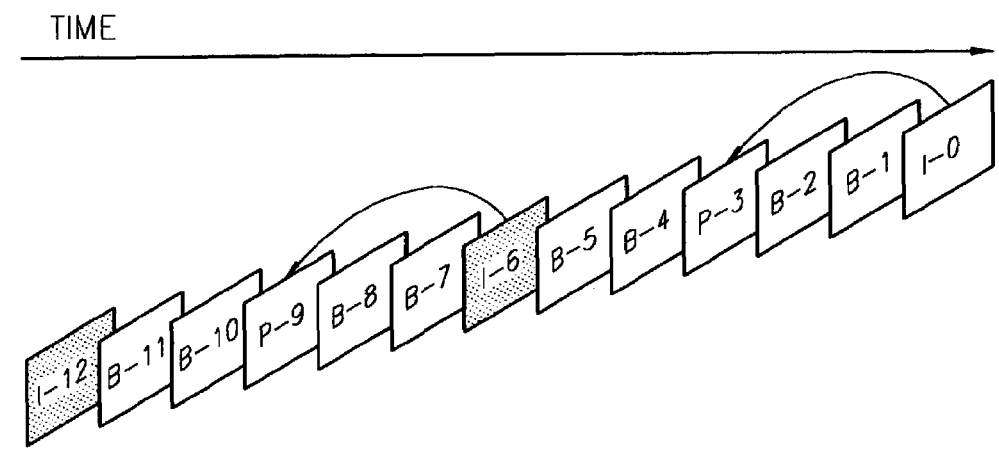
Figures 10D, 10E:
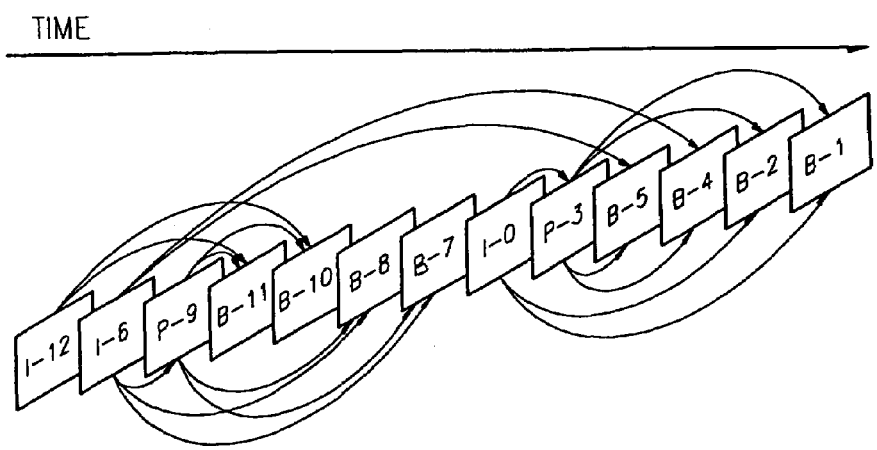

As discussed above, the P frames in the independent small group are decoded in step S32. FIGS. 10C-10E illustrate an example of this process. FIG. 10C illustrates the reverse display order of the GOP portion illustrated in FIG. 10A. FIG. 10D illustrates the decoding order of the frames illustrated in FIG. 10C during reverse play according to this embodiment of the present invention, and FIG. 10E illustrates the frames of the GOP stored in the frame memory 514 according to this embodiment. As shown, according to step S30, the I frames I12 and I6 are decoded and stored in the frame memory 514 to define an independent small group. Then, according to step S32, the P frame P9 in the independent small group defined by I frames I12 and I6 is decoded and stored in the frame memory 514.

Next, in step S34, the B frames in the independent small group are decoded. Again, with reference to the example in FIGS. 10C-10E, this involves decoding B frames B11, B10, B8 and B7 in the independent small group defined by I frames I12 and I6. FIG. 10D illustrates the decoding order of these B frames, and FIG. 10E illustrates the frames stored in the memory 514 during this process.

As is evident from FIG. 10E, not all of the B frames are stored by the frame memory 514. As will be discussed in more detail below, during the decoding process of FIG. 9, an overlapping display process is performed during which the decoded frames are output for display, and those frames that are no longer required for use in a decoding process, are overwritten in the decoding process.

Once the B frames are decoded, processing proceeds to step S36 wherein the controller 506 determines whether a decoding process for the GOP has been completed. If the decoding process has been completed, then in step S38, the decoding process for the next GOP is initiated, and processing returns to step S30 for the next GOP. However, if processing of the GOP is not complete, then in step S40, the next I frame in the reverse display order is decoded to form the next independent small group. For example, with respect to FIGS. 10C-10E, the next I frame in the reverse display order of this example is I frame I0. Accordingly, this I frame is decoded and stored in the frame memory 10E. Because one independent small group does not rely upon the other independent small group in order to perform the decoding process, the non-overlapping frames in the previous independent small group no longer need to be stored in the frame memory 514. As shown in FIG. 10E, only the I frame I6 overlaps between the two independent small groups; and therefore, is the only frame remaining in the frame memory 514 when processing of the next independent small group begins.

After step S40, processing continues at step S32 for the next independent small group. FIGS. 10C-10E illustrate the display order, decoding order and the frames stored in the frame memory 514 for this next independent small group.

As the frames of a GOP are decoded, the controller 506 controls the display controller 508 to access the decoded frames from the frame memory 514 and generate the display output. Specifically, once a frame has been decoded, the display controller 508 is permitted to access and generate the display output for that frame. Furthermore as evidenced by the example shown in FIG. 10E, once a frame has been displayed by the display controller 508, and if that frame is no longer necessary for the decoding process, the frame is no longer retained in the frame memory 514.

Accordingly, the frame memory space required for reverse play according to this embodiment of the present invention is the number of frames required for decoding a B frame (i.e., two) plus the number of P frames not encoded into an I frame in an independent small group plus one B frame.

Because, according to the present invention, only selected P frames are decoded and stored as I frames, the method for reverse play according to the present invention requires a significantly smaller storage device. Additionally, because reverse play according to the present method does not result in skipped frames, excellent picture quality is achieved in the reverse play mode as well.

SECOND EMBODIMENT

Figure 12:
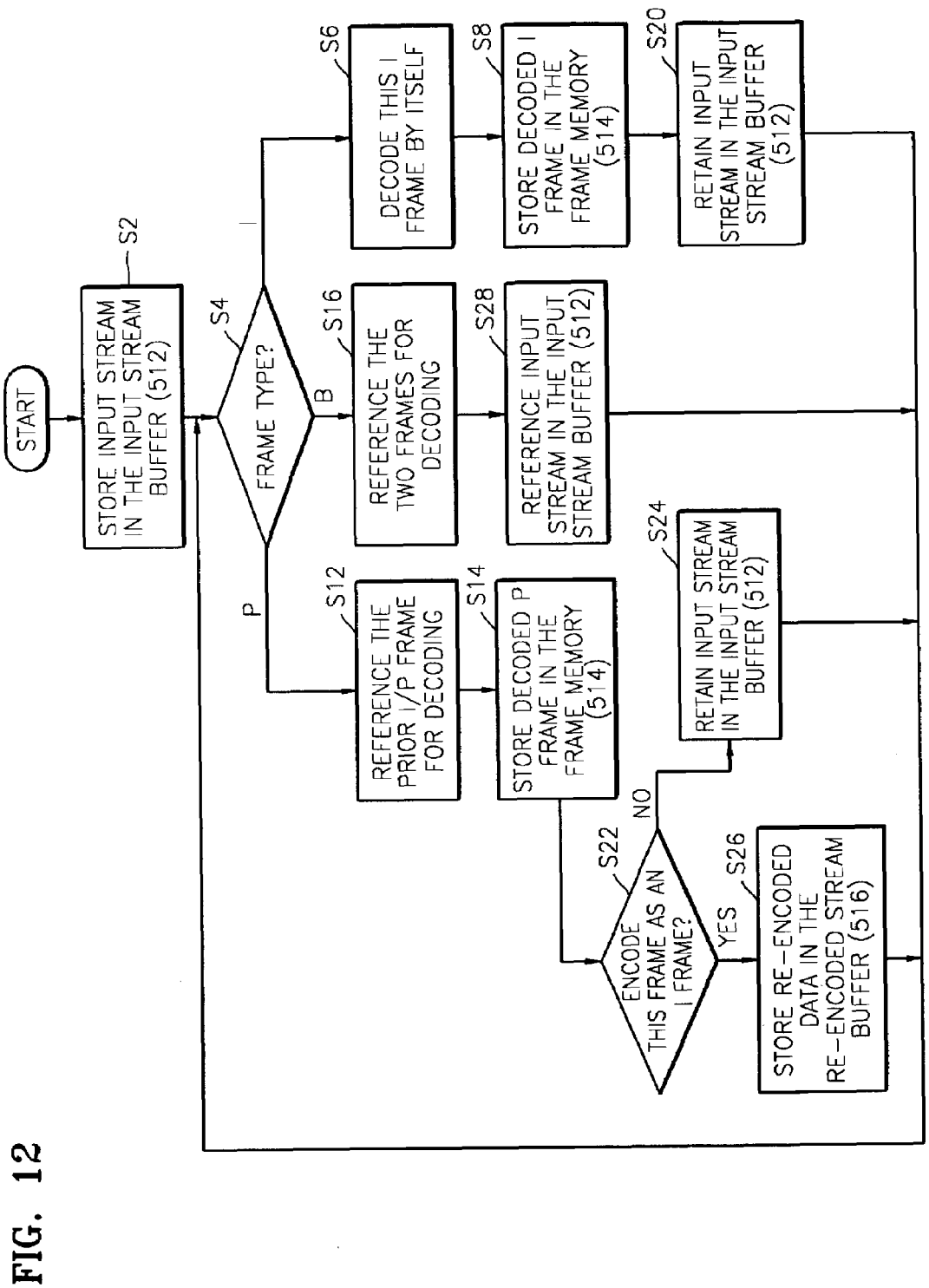
FIG. 12 illustrates the re-encoding of P frames as anchor frames according to a second embodiment of the present invention.

According to the second embodiment of the method for reverse play according to the present invention, the re-encoding process of the first embodiment described above with respect to FIG. 8 is performed as part of the decoding operation during the forward play mode as illustrated in FIG. 6. Namely, as the frames are decoded for forward play, the encoded I and B frames are retained in the input stream buffer 512, and the selected, decoded P frames are re-encoded as I frames and stored in the re-encoded stream buffer 516. This combined process is illustrated in FIG. 12. Because of each of the steps in FIG. 12 has been described above with respect to one of FIGS. 6 and 8, a description of these steps will not be repeated for the sake of brevity.

Accordingly, in the second embodiment, when the reverse play mode is selected by the user through user controller 520, the re-encoding process of the first embodiment does not need to be performed. Instead, the reverse play mode begins with the decoding process discussed above with respect to FIG. 9, and reverse playback proceeds as discussed above with respect to the first embodiment.

THIRD EMBODIMENT

The method for reverse play according to the third embodiment of the present invention is the same as either the first or second embodiments of the present invention except that not all of the decoded frames needed for decoding of subsequent P or B frames are stored in the frame memory 514. As a result, less memory space is required for reverse play according to this embodiment, but additional decoding steps are necessary.

Figures 13A, 13B:
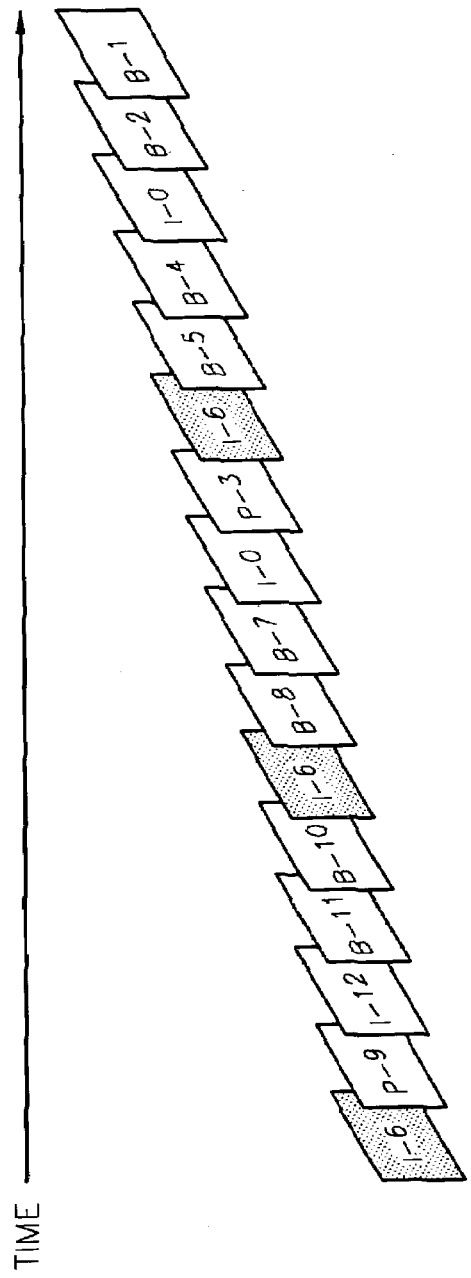
FIGS. 13A and 13B illustrate the reverse play decoding order and frame memory contents, respectively, for reverse play according to a third embodiment of the present invention.

Consider the example portion of a GOP illustrated in FIG. 10A and the re-encoding of that GOP portion as illustrated in the example of FIG. 10B, wherein every other P frame is re-encoded as an I frame. In this example, the reverse display order is shown in FIG. 10C. According to this third embodiment of the present invention, only the frames necessary for a subsequent decoding operation are maintained in the frame memory 514. Therefore, for the example given in FIGS. 10A-10C, the decoding order becomes as shown in FIG. 13A, and the frames stored during the decoding process of the frame memory are as shown in FIG. 13B. A comparison of FIG. 13B with FIG. 10E demonstrates that the third embodiment of the present invention requires storing less frames in the frame memory, but as a comparison of FIG. 13A with FIG. 10D demonstrates, this third embodiment requires additional decoding operations. Namely, an I frame picture in the group of pictures is decoded and stored in the frame memory 514 more than once during the reverse play of the GOP.

FOURTH EMBODIMENT

Figure 14:
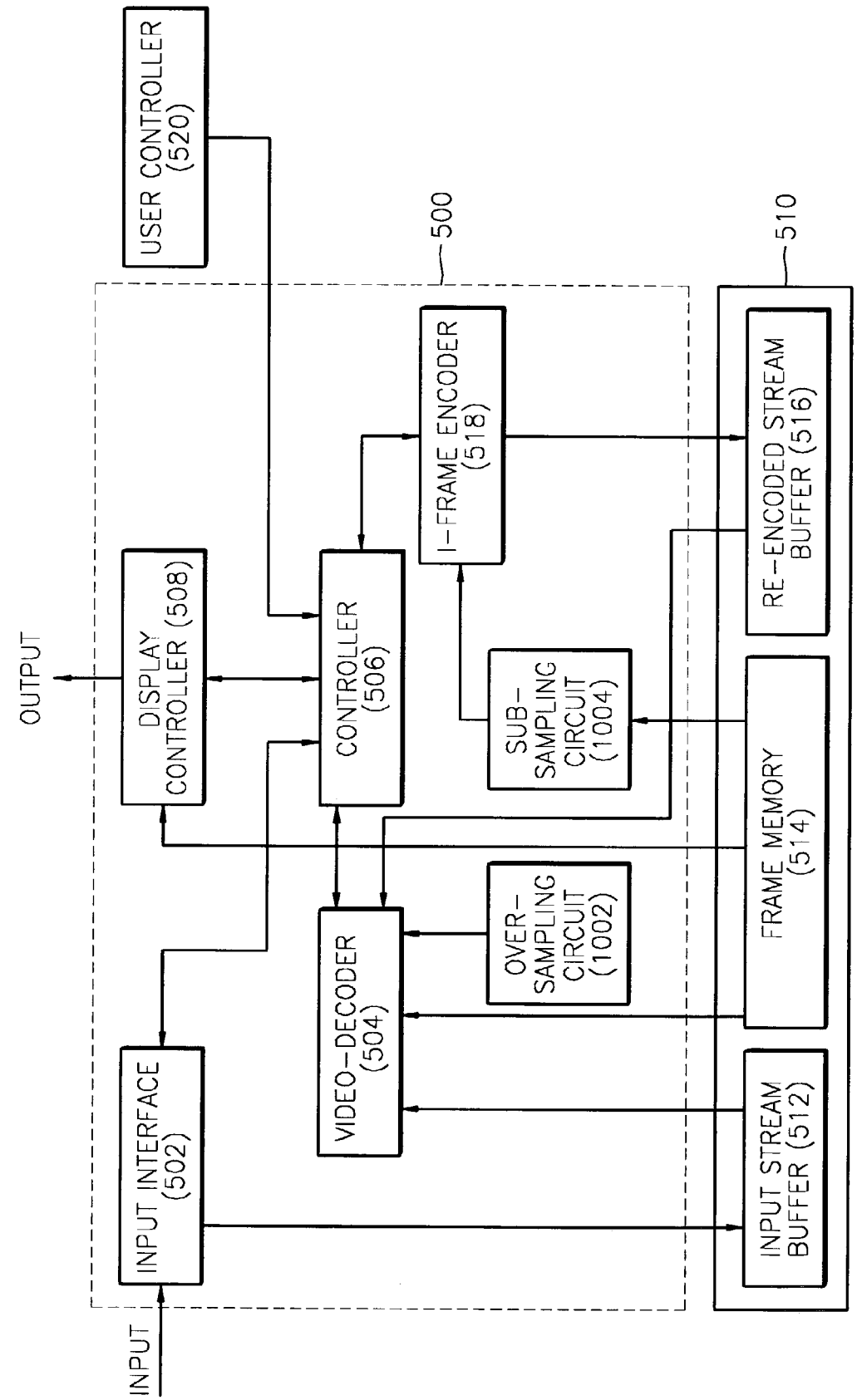
FIG. 14 illustrates a block diagram of another embodiment of a system architecture according to the present invention for supporting a fourth embodiment of the method for reverse play according to the present invention.

FIG. 14 illustrates a block diagram of another architecture according to the present invention for implementing the method for reverse play according to the present invention. As shown, the embodiment of FIG. 14 is the same as that illustrated in FIG. 5 except that an over-sampling circuit 1002 and a sub-sampling circuit 1004 have been added. The over-sampling circuit 1002 is disposed between the video decoder 504 and the frame memory 514, and the sub-sampling circuit 1004 is disposed between the frame memory 514 and the I frame encoder 518.

Figure 15:
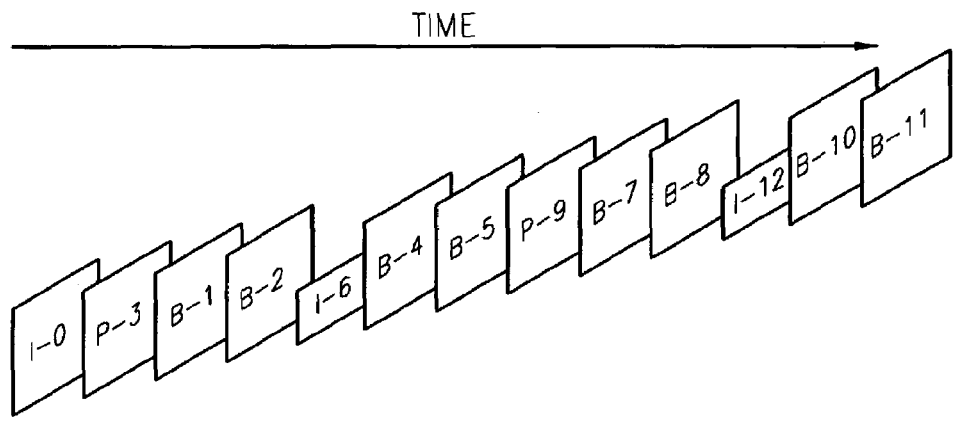
FIG. 15 illustrates the re-encoded MPEG stream according to the fourth embodiment of the present invention.

According to this embodiment, the P frames which are selected for re-encoding as I frames undergo a sub-sampling operation as performed by the sub-sampling circuit 1004. The sub-sampling circuit 1004 can be embodied as a conventional sampler. As a result of this sub-sampling operation, a smaller amount of data is re-encoded and stored in the re-encoded stream buffer 516. FIG. 15 illustrates the resulting re-encoded MPEG stream as a result of the sub-sampling operation.

During the decoding process for reverse play, the decoded, sub-sampled I frames undergo an over-sampling operation performed by over-sampling circuit 1002 such that the decoded sub-sampled I frames are restored to their original size when stored in the frame memory 514. Having restored these frames to their original size permits their use in the subsequent decoding other B and P frames according to the embodiments of the present invention discussed above.

FIFTH EMBODIMENT

Figure 16A:
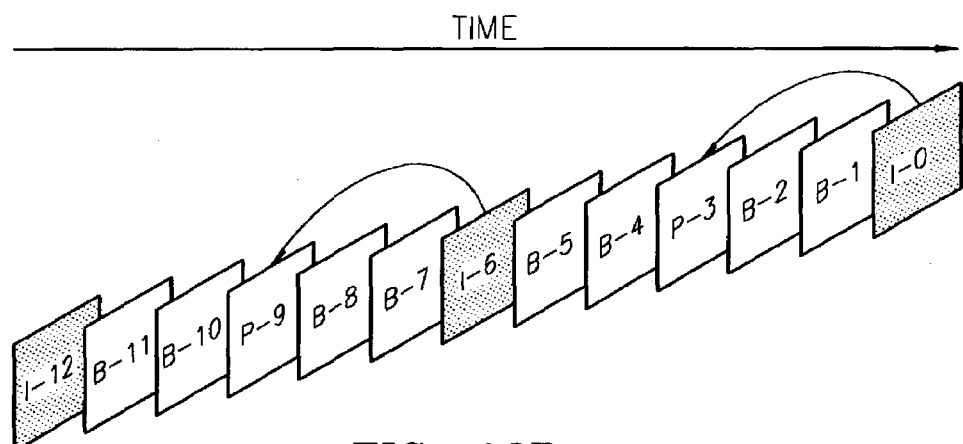
FIGS. 16A and 16B illustrate the encoded MPEG data stream before and after processing according to a fifth embodiment of the present invention.
Figure 16B:
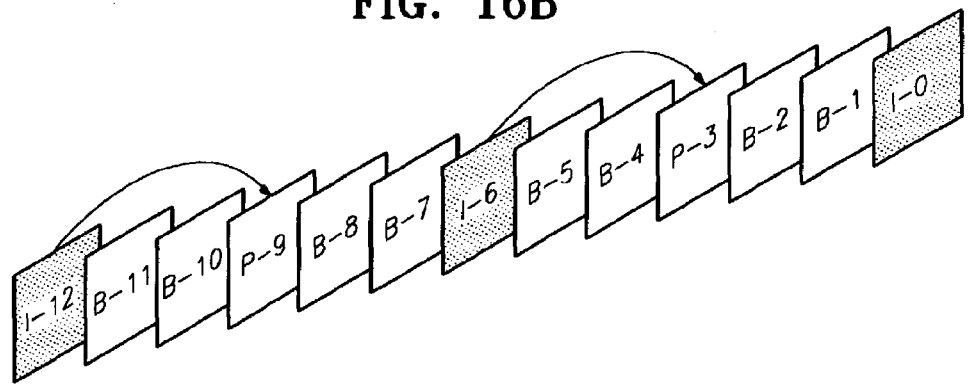

According to the method of the present invention, a subset of the P frames in a GOP are re-encoded as I frames. According to this fifth embodiment of the present invention, the P frames which do not undergo re-encoding into I frames are decompressed and re-encoded as P frames; however, the re-encoding is based on the I frame (including P frames re-encoded as I frames) or P frame that will precede the P frame in the reverse display order. With respect to the example GOP portion illustrated in FIG. 10A, FIG. 16A illustrates that P frames P9 and P3 are encoded based on I frames I6 and I0, respectively, when the fifth embodiment of the present invention is not employed. However, employing the fifth embodiment causes the P frames P3 and P9 to be decompressed and re-encoded based on I frames I6 and I12, respectively. This greatly simplifies the decoding process according to the present invention especially when more than one P frame exists in an independent small group.

While the system and method according to the present invention, and the specific embodiments thereof, have been described with respect to an MPEG data stream divided into frames, it should be understood that the present invention is applicable to any type of picture such as even and odd fields, top and bottom fields, etc. Furthermore, while the present invention has been described with respect to the MPEG standard, it should also be understood that the present invention is applicable to any compressed video data stream encoded using predictive encoding techniques.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of preparing a compressed video stream for output in reverse temporal order, comprising:
   receiving, at a video player, the compressed video stream, which includes anchor pictures and forward predictive encoded pictures, the forward predictive encoded pictures being encoded based on a temporally preceding anchor picture or forward predictive encoded picture;
   decoding, using a decoder of the video player, the received forward predictive encoded pictures; and
   encoding, using an encoder of the video player, a first subset of the decoded forward predictive encoded pictures as anchor pictures to generate a compressed video stream suitable for being output in reverse temporal order, the first subset including less than all of the decoded forward predictive encoded pictures; wherein
   the compressed video stream is organized into at least one group of pictures, each of the at least one groups of pictures including at least two independent small groups of encoded pictures, each of the at least two independent small groups of pictures including at least one anchor picture, and when outputting the compressed video stream in reverse temporal order, only a portion of the group of pictures are stored in a frame memory.

2. The method of claim 1, wherein the encoding steps skips, for a group of pictures, encoding every n forward predictive encoded pictures, where n is an integer greater than or equal to one.

3. The method of claim 2, wherein the forward predictive encoded pictures are P frames.

4. The method of claim 1, wherein the encoding step is performed during a process to decompress and output the compressed video stream for display in a forward temporal order.

5. The method of claim 1, further comprising:
   sub-sampling the decoded forward predictive encoded pictures that are to be encoded prior to the encoding step.

6. The method of claim 1, further comprising:
   encoding a second subset of the decoded forward predictive encoded pictures as reverse predictive encoded pictures, the reverse predictive encoded pictures being encoded based on a temporally preceding, in a reverse play order, anchor picture or reverse predictive encoded picture, the first and second subsets being mutually exclusive, and the second subset including less than all of the decoded forward predictive encoded pictures.

7. The method of claim 1, wherein the compressed video stream is an MPEG video stream.

8. The method of claim 1, further comprising:
   storing the anchor pictures output from the encoding step.

9. A method of outputting a compressed video stream in decompressed form and in reverse temporal order, comprising:
   receiving, at a video player, the compressed video stream, which includes anchor pictures and forward predictive encoded pictures, the forward predictive encoded pictures being encoded based on a temporally preceding anchor picture or forward predictive encoded picture;
   transforming, using an encoder of the video player, a first subset of the forward predictive encoded pictures into anchor pictures to generate a compressed video stream suitable for being output in reverse temporal order, the first subset including less than all of the decoded forward predictive encoded pictures;
   decompressing, using a decoder of the video player, the compressed video stream for output in reverse temporal order using the anchor pictures output from the transforming step; and
   outputting, using a display controller of the video player, the decompressed video stream in reverse temporal order; wherein
   the compressed video stream is organized into at least one group of pictures, each of the at least one groups of pictures including at least two independent small groups of encoded pictures, each of the at least two independent small groups of pictures including at least one anchor picture, and when outputting the compressed video stream in reverse temporal order, only a portion of the group of pictures are stored in a frame memory.

10. The method of claim 9, wherein the transforming step comprises:
   decoding the received forward predictive encoded pictures; and
   encoding the first subset of the decoded forward predictive encoded pictures as anchor pictures.

11. The method of claim 10, wherein the encoding steps skip, for a group of pictures, encoding every other forward predictive encoded picture in the group of pictures.

12. The method of claim 9, wherein the transforming step is performed during a process to decompress and output the compressed video stream for display in a forward temporal order.

13. The method of claim 9, wherein the transforming and outputting steps are conducted in parallel for temporally different video data.

14. The method of claim 9, further comprising:
   sub-sampling the decoded forward predictive encoded pictures that are to be transformed prior to the transforming step; and wherein
   the decompressing step includes over-sampling the anchor pictures output from the transforming step prior to decompressing the anchor pictures.

15. The method of claim 9, further comprising:
   transforming a second subset of the forward predictive encoded pictures into reverse predictive encoded pictures, the reverse predictive encoded pictures being encoded based on a temporally preceding anchor picture or reverse predictive encoded picture, the first and second subsets being mutually exclusive, and the second subset including less than all of the decoded forward predictive encoded pictures.

16. The method of claim 9, wherein the compressed video stream is an MPEG video stream.

17. The method of claim 9, wherein the decompressing step comprises:
   decompressing and storing, in a memory, a pair of temporally consecutive anchor pictures;
   decompressing and storing, in the memory, each forward predictive picture disposed temporally between the pair of temporally consecutive anchor pictures.

18. The method of claim 9, wherein the decompressing step decompresses and stores an anchor picture in a group of pictures more than one time during the decompression of the group of pictures.

19. A video player, comprising:
   an input stream buffer receiving a compressed video stream, which includes anchor pictures and forward predictive encoded pictures, the forward predictive encoded pictures being encoded based on a temporally preceding anchor picture or forward predictive encoded picture;
   a video-decoder decoding the received forward predictive encoded pictures;
   an anchor picture encoder encoding a first subset of the decoded forward predictive encoded pictures as anchor pictures to generate a compressed video stream suitable for being output in reverse temporal order, the first subset including less than all of the decoded forward predictive encoded pictures, and the compressed video stream being organized into at least one group of pictures, each of the at least one groups of pictures including at least two independent small groups of encoded pictures, each of the at least two independent small groups of pictures including at least one anchor picture; and
   a frame memory storing frames of the compressed video stream for output in reverse temporal order; wherein
      when outputting the compressed video stream in reverse temporal order, the frame memory stores only a portion of the group of pictures.

20. A video player, comprising:
   an input stream buffer receiving a compressed video stream, which includes anchor pictures and forward predictive encoded pictures, the forward predictive encoded pictures being encoded based on a temporally preceding anchor picture or forward predictive encoded picture;
   a video-decoder and anchor picture encoder transforming a first subset of the forward predictive encoded pictures into anchor pictures to generate a compressed video stream suitable for being output in reverse temporal order, the first subset including less than all of the decoded forward predictive encoded pictures;
   a controller controlling the video-decoder to decompress the compressed video stream for output in reverse temporal order using the anchor pictures generated in the transforming process; and
   a display controller outputting the decompressed video stream in reverse temporal order; wherein
      the compressed video stream is organized into at least one group of pictures, each of the at least one groups of pictures including at least two independent small groups of encoded pictures, each of the at least two independent small groups of pictures including at least one anchor picture, arid when outputting the compressed video stream in reverse temporal order, only a portion of the group of pictures are stored in a frame memory.

* * * * *